United States Patent
Quinlan et al.

[11] 3,785,002
[45] Jan. 15, 1974

[54] WINDSHIELD WIPER ASSEMBLY

[75] Inventors: William J. Quinlan; Lawrence L. Huver, both of Hastings, Mich.

[73] Assignee: Hastings Manufacturing Company, Hastings, Mich.

[22] Filed: Dec. 6, 1972

[21] Appl. No.: 312,743

Related U.S. Application Data

[60] Division of Ser. No. 259,672, June 5, 1973, Pat. No. 3,751,754, Continuation-in-part of Ser. No. 190,067, Oct. 18, 1971, Pat. No. 3,725,971, which is a continuation-in-part of Ser. No. 90,987, Nov. 19, 1970, Pat. No. 3,717,900.

[52] U.S. Cl. ............................................. 15/250.36
[51] Int. Cl. ............................................... B60s 1/38
[58] Field of Search .................... 15/250.36, 250.42

[56] References Cited
UNITED STATES PATENTS

| 3,428,997 | 2/1969 | Rickett | 15/250.36 |
| 3,566,432 | 3/1971 | Quinlan et al. | 15/250.36 |

FOREIGN PATENTS OR APPLICATIONS

| 942,072 | 4/1956 | Germany | 15/250.36 |
| 1,952,855 | 4/1971 | Germany | 15/250.36 |

Primary Examiner—Peter Feldman
Attorney—Munson H. Lane

[57] ABSTRACT

A wiper blade unit has fasteners extending through clearance apertures in an arm connector so that the blade unit may become laterally canted within limits relative to the arm connector in both wiping directions. The blade unit includes a resilient blade body having a crown portion with a cavity containing metallic leaf springs and a wiping portion beneath the crown portion including a narrow wiping lip and an intermediate body portion which is progressively narrower in cross section from the base of the crown portion in the direction of the wiping lip. A longitudinally extending hollow core which is capable of cross sectional deformation to correspondingly deform and vary the resiliency of the body portions surrounding the core as a function of changes in direction and pressure of wiping forces at the wiping lip is provided in the blade body spaced below the spring cavity and extending into the progressively narrower intermediate portion. Straps inserted into end portions of the cavity are provided with closure caps which abuttingly engage the leaf springs and prevent longitudinal movement of the springs relative to the blade body.

6 Claims, 8 Drawing Figures

PATENTED JAN 15 1974

WINDSHIELD WIPER ASSEMBLY

RELATED APPLICATION

This is a division of application Ser. No. 259,672, filed June 5, 1972, now U.S. Pat. No. 3,751,754. This application is a continuation-in-part of application Ser. No. 190,067, filed Oct. 18, 1971, now U.S. Pat. No. 3,725,971, which is a continuation-in-part of Ser. No. 90,987, filed Nov. 19, 1970, now U.S. Pat. No. 3,717,900.

This invention relates to new and useful improvements in windshield wiper assemblies, and in particular the invention concerns itself with certain structural and functional improvements in means for attaching a wiper blade unit to a wiper arm connector, as well as in the wiper blade unit itself. As such, the invention represents an improved arrangement of the windshield wiper assembly disclosed in the aforementioned related application Ser. No. 190,067, of which this application is a continuation-in-part, and in applications Ser. No. 90,987 and Ser. No. 267,620, filed June 29, 1972, which is a division of Ser. No. 90,987, filed Nov. 19, 1970.

One important feature of the present invention involves the provision of means whereby the wiper blade unit is loosely attached to the wiper arm connector so that the blade unit may cant laterally relative to the connector in both wiping directions. This canting action, held within limits, allows the wiping edge of the blade to contact the windshield with the same relationship throughout the length of the blade, which is particularly important with curved blades and windshields having compound curvatures.

Another important feature of the invention resides in the structure of the blade unit itself, which includes a blade body of resilient material containing metallic leaf spring means, together with improved closure means at the ends of the blade body to prevent longitudinal movement of the leaf spring means relative thereto.

Another important feature of the invention resides in the structure of the blade body which includes a hollow crown portion, having a longitudinally extending cavity for receiving leaf springs, and a wiping portion integral with the crown portion, the body further having a longitudinally extending hollow core which is capable of cross sectional deformation to correspondingly deform and vary the resiliency of the body portions surrounding the core as a function of changes in direction and pressure of wiping forces at the wiping lip, the hollow core being positioned beneath the spring receiving cavity and extending into the wiping portion.

With the foregoing more important object and features in view and such other objects and features which may become apparent as this specification proceeds, the invention will be understood from the following description taken in conjunction with the accompanying drawings, in which like characters of reference designate like parts, and in which.

Figure 1:
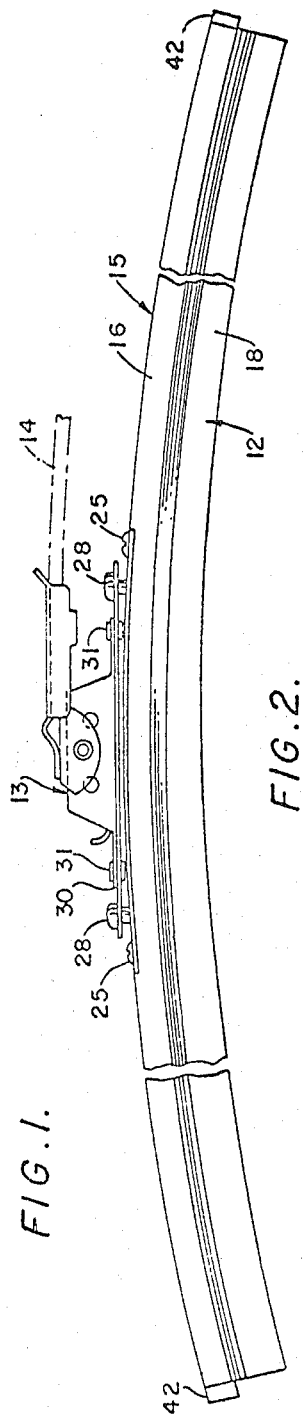
FIG. 1 is a side elevational view of a windshield wiper assembly in accordance with the invention.

Referring now to the accompanying drawings in detail, more particularly to FIGS. 1–5, the improved windshield wiper assembly is designed generally by the reference numeral 10 and consists of two main components, namely a wiper blade unit 12 and a connector 13 which attaches the blade unit to a conventional wiper arm shown by the dotted lines 14.

Figure 2:
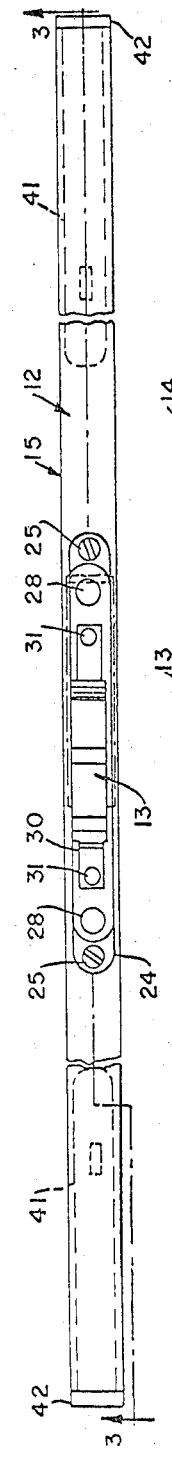
FIG. 2 is a top plan view thereof.
Figure 3:
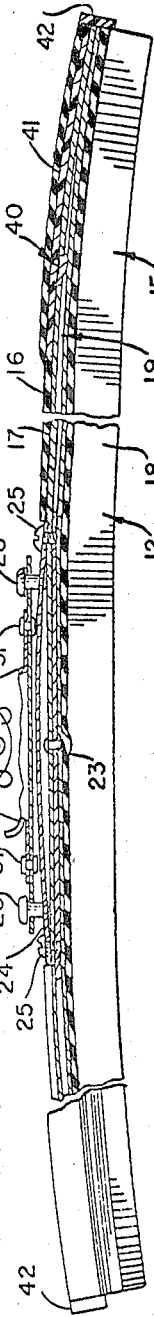
FIG. 3 is a longitudinal sectional view thereof.

For illustrative purposes the blade unit 12 may be of the particular construction disclosed in the aforementioned application No. 90,987 and the connector 13 may also be of the construction shown in FIGS. 1–3 of that application, and the description which follows is related to those types of blade unit and connector. However, an important aspect of the present invention concerns a special attachment of the blade unit to the connector, and this may be applicable to other types of blade units and other types of connectors, not necessarily those mentioned above.

With the foregoing in view, the blade unit 12 includes a blade body 15 formed from resiliently flexible material such as rubber, plastic, or the like, the body having a hollow crown portion 16 defining a longitudinally extending open-ended cavity 17 therein, and a lower wiping portion 18 which is integral with the base of the crown portion 16. The elongated cavity 17 contains metallic leaf spring means 19 consisting of a set of leaf springs disposed in superposed relation within the cavity 17 of the crown portion 16. All or at least some of the leaf springs in the set are initially longitudinally curved, although some of them in the set may be initially flat and become longitudinally curved when associated with the others in the set, so as to produce the desired degree of curvature and resiliently yieldable support of the blade unit as a whole, all this being in accordance with the disclosure in the aforementioned application Ser. No. 90,987. Also, some of the leaf springs in the set may be shorter than others, as for example, the spring 20 being shorter than the springs 21, 22 (see FIG. 5), but at least one of the springs, for example the spring 21, is coextensive in length with the cavity 17 or, in other words, extends from one end of the blade body 15 to the other. The several springs in the set 19 are secured together, as by a rivet 23.

Figure 5:
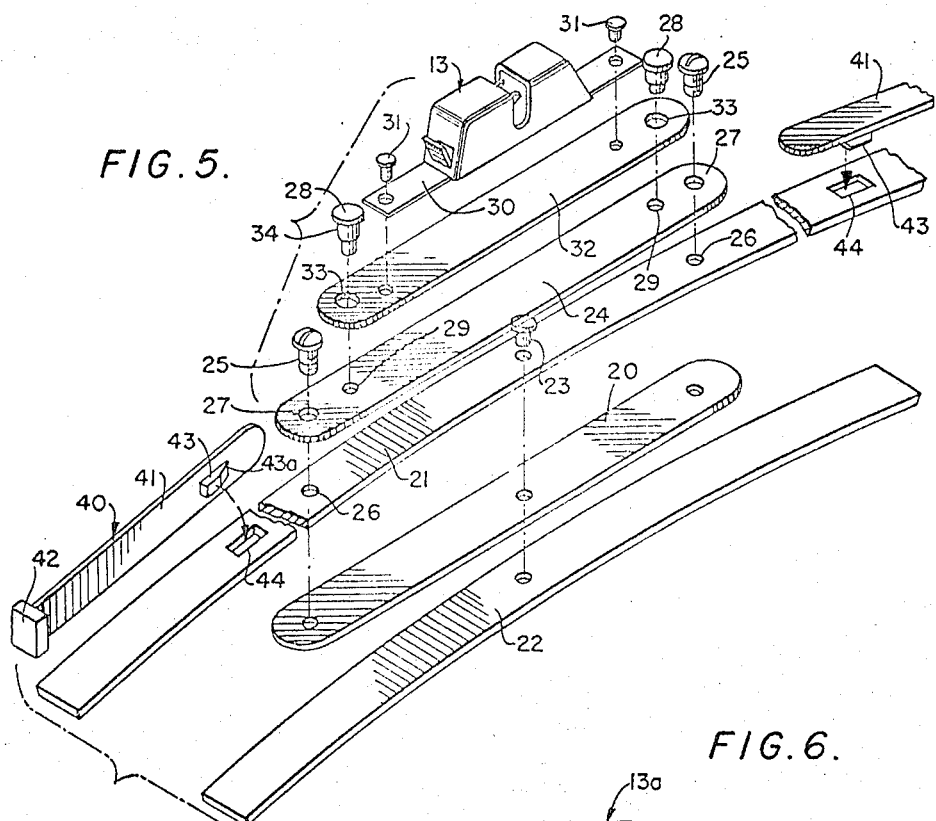
FIG. 5 is a fragmentary, exploded perspective view of the connector, spring means, closure means and associated components with the resilient blade body omitted for sake of clarity.

In accordance with the invention, a mounting strip 24 is superposed on the crown portion of the blade body and is rigidly secured to the leaf spring means 19 by a pair of screws 25 engaging threaded apertures 26 in the uppermost leaf spring 21, the screws 25 passing through apertures 27 in the end portions of the strip 24, as will be apparent from FIG. 5. A pair of shouldered rivets 28 are secured in apertures 29 in the mounting strip 24 and project upwardly from the blade unit 12, as is best shown in FIGS. 1 and 3. For all practical purposes, the mounting strip 24 may be superposed on the material of the crown portion 16 of the blade body, but if preferred, the top of the crown portion may be removed so that the strip 24 is superposed directly on the leaf spring 21, as shown in the drawings. In any event, the two shouldered rivets 28 project upwardly from the blade unit, as already explained.

Figure 4:
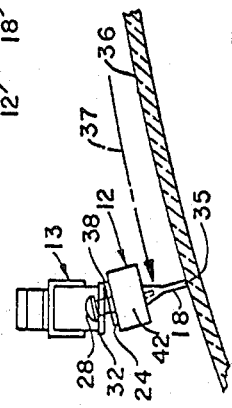
FIG. 4 is an end view, showing the blade unit canted on the windshield relative to the arm connector.

The wiper arm connector 13 includes a strip-like base 30 apertured to receive a pair of rivets 31 which secure that base to a support strip 32. The latter is provided with clearance apertures 33 which loosely or rockably receive the shoulders 34 of the aforementioned rivets 28. It is significant to note that the rivet shoulders 34 are sufficiently loose in the clearance apertures 33 of the support strip 32 that, when viewed in end elevation as in FIG. 4, the entire blade unit 12 may become canted laterally with respect to the connector 13, thus assuring that the wiping edge 35 of the blade unit is in contact with the windshield 36 with the same relationship throughout the length of the blade, as is desirable with longitudinally curved blades and compound-curved windshields of the general type to which this invention relates. The canting action of the blade unit 12 relative to the connector 13 occurs in both wiping directions, one such direction being indicated by the arrow 37 in FIG. 4. In either wiping direction, the mounting strip 24 of the blade unit 12 and the support strip 32 of the connector 13 have corresponding leading and trailing edges — related to the direction of the wiping movement — and as indicated in FIG. 4, the trailing edges of the two strips come together as at 38. This provides stop means for limiting the canting action of the blade unit relative to the connector, it being noted that such canting movement must be sufficiently large to facilitate the effective blade contact with the windshield as already mentioned, yet not too large so as to allow too much of the rubberblade body to lay on the windshield and cause undue frictional drag. In this same context, the axial length of the rivet shoulders 34 and their clearance in the apertures 38 is to be accurately controlled so that only an appropriate amount or degree of canting of the blade unit with respect to the connector is possible.

In addition to the foregoing which deals with the particular canting attachment of the blade unit to the arm connector, the present invention also relates to the structure of the blade unit itself, and particularly to improved means for closing off the ends of the cavity 17 in the crown portion 16 of the blade body 15, such closure means being effective to prevent longitudinal movement of the leaf spring means 19 within the blade body, so that the mounting strip 24 and its shouldered rivets 28 are always properly positioned for attachment to the support strip 32 of the arm connector 13. Inasmuch as the closure means at both ends of the blade body 15 are the same, a description of one will suffice for both.

As shown in FIG. 5 and also in the right-hand portion of FIG. 2, the closure means 40 at each end of the blade body 15 comprises a strap 41 of metal, plastic, or the like, which is sufficiently rigid to be slidably inserted into the end portion of the cavity 17 above the uppermost leaf spring 21 of the leaf spring means 19. A closure cap 42 is formed integrally at the outer end of the strap 41 and this cap closes off the adjacent open end of the cavity 17 when the strap 41 is installed. Also, the cap 42 abuttingly engages the outer end of the leaf spring 21 which extends along the whole length of the cavity 17, and in this manner the cap prevents longitudinal movement of the entire leaf spring assembly 19 in relation to the blade body 15.

Although the closure means 40 are firmly held in place by frictional insertion of the strap 41 into the cavity 17 in conjunction with the leaf spring means 19, additional, more positive means are provided for preventing longitudinal movement of the closure means 40 in relation to the leaf spring means 19. Such additional means involve the provision of a detent 43 on the strap 41, which detent is seated in an opening 44 formed in the adjacent end portion of the leaf spring 21, thus positively preventing longitudinal shifting of the closure means strap 41 relative to the spring means 19. As shown in the left-hand portion of FIG. 5, the detent 43 may have a wedge end or beveled end portion 43a to facilitate sliding insertion of the strap 41 into the cavity 17 and subsequent seating of the detent in the opening 44.

Figure 6:
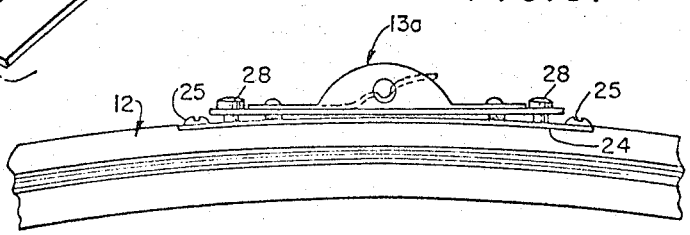
FIG. 6 is a fragmentary side elevational view of the invention utilizing a different type of a connector.
Figure 7:
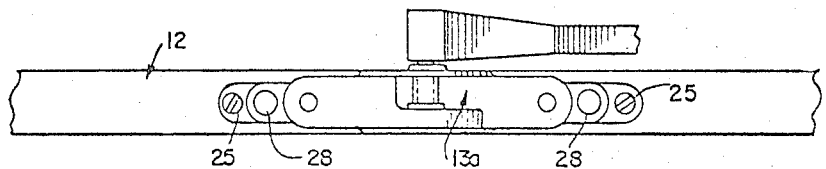
FIG. 7 is a fragmentary top plan view of the subject shown in FIG. 6.

The accompanying FIGS. 6 and 7 show a slightly modified embodiment which is substantially the same as the structure already described, except that the specific type of arm connector 13 shown in FIGS. 1–5 is substituted by a different type of arm connector 13a, of the type shown in FIGS. 12–16 in the aforementioned patent application Serial No. 90,987. Apart from this difference, the attachment of the blade unit to the connector and the blade unit structure itself is the same as already described in regard to FIGS. 1–5 herein.

Figure 8:
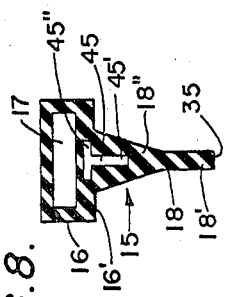
FIG. 8 is a typical vertical cross sectional view of the wiper blade body taken anywhere along its length prior to its assembly with other elements of the blade unit.

FIG. 8 shows a typical vertical cross section of the blade body 15 taken at any position along its length before the leaf springs 19 are inserted in the cavity 17. The crown portion 16 is of generally rectangular cross sectional shape, being longer in its horizontal dimension than in its vertical dimension. The lower wiping portion 18 includes a narrow wiping lip 18' and an intermediate body portion 18" which is progressively narrower in cross section from the base 16' of the crown portion in the direction of the wiping lip. The wiping lip 18' is of uniform thickness from its wiping edge 35 to its structure with the intermediate body portion 18". A longitudinally extending hollow core 45 is provided in the blade body 15 beneath the cavity 17. The hollow core 45 is normally of a substantially T-shaped cross section including a laterally extending head portion 45" and a leg portion 45' normal to the head portion. The head portion 45" of the T-shaped core is mounted within the wide crown portion and is substantially parallel to the base 16' of the crown portion, and the leg portion extends away from the crown portion into the progressively narrower intermediate body portion. The hollow core 45 is capable of cross sectional deformation to correspondingly deform and vary the resiliency of the blade body surrounding the core as a function of changes in direction and pressure of wiping force at the lip 18'.

The purpose and function of the hollow core 45 is similar to the hollow cores disclosed in our prior Patent No. 3,566,432, issued Mar. 2, 1971 and whereas a T-shaped core as illustrated in FIG. 8 is the preferred shape for the hollow core, cores of the other shapes as disclosed in U.S. Patent No. 3,566,432 may be substituted.

While in the foregoing there have been described and shown the preferred embodiments of the invention, various modifications and equivalents may be resorted to within the spirit and scope of the invention as claimed.

What is claimed is:

1. A windshield wiper blade component comprising an elongated elastomeric body including a broad longitudinal crown portion which defines a longitudinally extending cavity for receiving leaf spring means, and a lower wiping portion integral with the base of said crown portion, said blade body having a longitudinally extending deformable hollow core spaced from and beneath said cavity and extending into said wiping portion, said lower wiping portion including a narrow wiping lip and an intermediate body portion connecting said wiping lip to the base of said crown portion, said hollow core being of substantially T-shaped cross section including a laterally extending head and a leg portion normal to the head portion with a portion of said T-shaped hollow core extending into said broad crown portion.

2. A windshield wiper blade component comprising an elongated elastomeric body including a broad longitudinal crown portion which defines a longitudinally extending cavity for receiving leaf spring means, and a lower wiping portion integral with the base of said crown portion, said blade body having a longitudinally extending deformable hollow core T-shaped in cross section, spaced from and beneath said cavity and extending into said wiping portion, said lower wiping portion including a narrow wiping lip, and an intermediate body portion connecting said wiping lip to the base of said crown portion, said intermediate body portion being progressively narrower in cross section from the base of said crown portion in the direction of said wiping lip, said hollow core being of substantially T-shaped cross section including a laterally extending head portion and a leg portion normal to the head portion, the head portion of such T-shaped core being mounted within the broad crown portion and substantially parallel to the base of said crown portion and said leg portion extending away from the crown portion into said progressively narrower intermediate portion.

3. The device set forth in claim 1 wherein said crown portion is substantially rectangular in cross section being longer in horizontal dimension than in vertical dimension and said wiping lip is of uniform thickness from its free wiping edge to its juncture with said intermediate body portion.

4. The device set forth in claim 1 together with leaf spring means contained within said cavity and snugly encompassed by said crown portion.

5. The device set forth in claim 4 wherein said elongated elastomeric body is normally straight and has a straight wiping edge, and wherein said leaf spring means is normally curved and imparts to said elongated elastomeric body a curved configuration for wiping a curved windshield.

6. The device set forth in claim 4 together with a mounting strip positioned on top of said crown and secured to said spring means, a windshield wiper arm connector, fasteners provided on said mounting strip and extending upwardly therefrom through clearance apertures in said arm connector, said fasteners being sufficiently loose in said apertures whereby the mounting strip may be laterally canted within limits relative to said connector.

* * * * *